March 31. 1925.

J. BOWEN

CASTER

Filed March 22, 1922     3 Sheets-Sheet 1

1,5 2,032

Inventor.
James Bowen
by his Attorneys.
Howson + Howson

March 31, 1925.
J. BOWEN
CASTER
Filed March 22, 1922  3 Sheets-Sheet 2
1,532,032
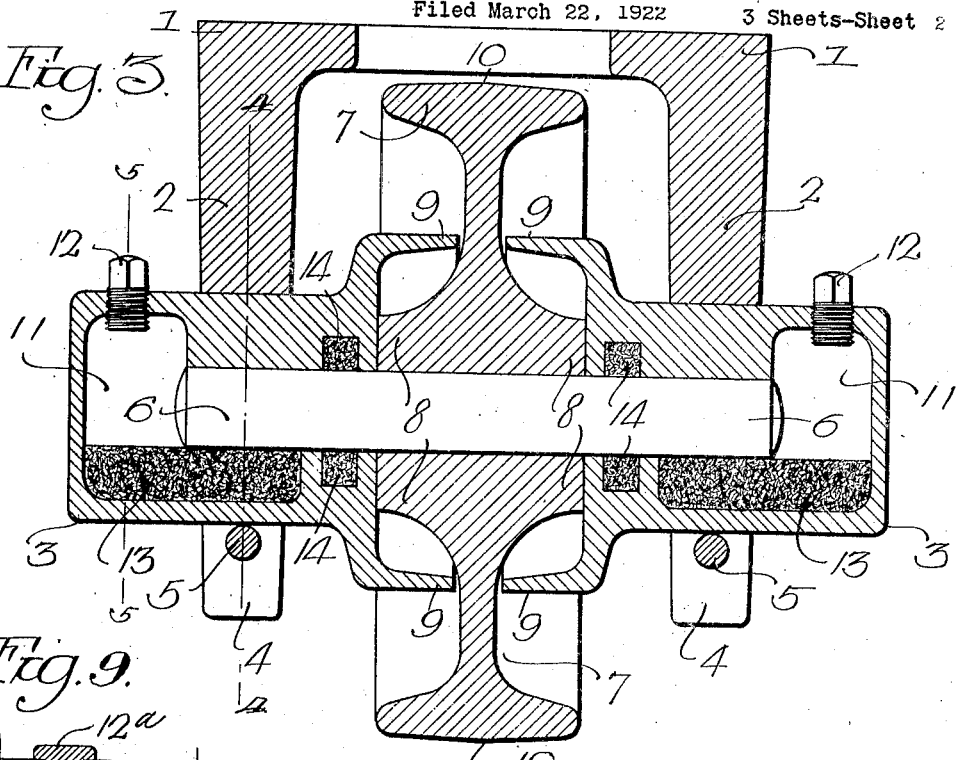
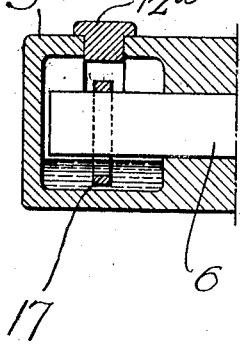
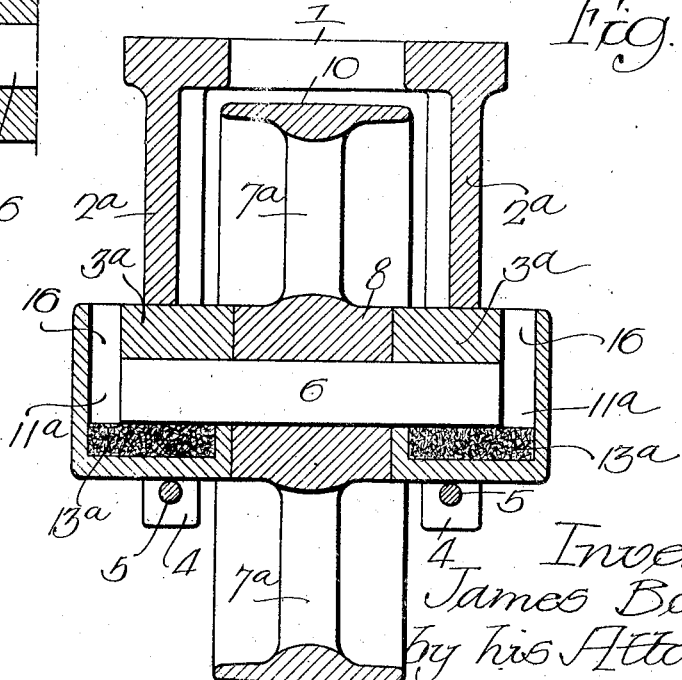
Inventor-
James Bowen.
by his Attorneys
Howson & Howson March 31. 1925.  
J. BOWEN  
1,532,032  
CASTER  
Filed March 22, 1922  3 Sheets-Sheet 3
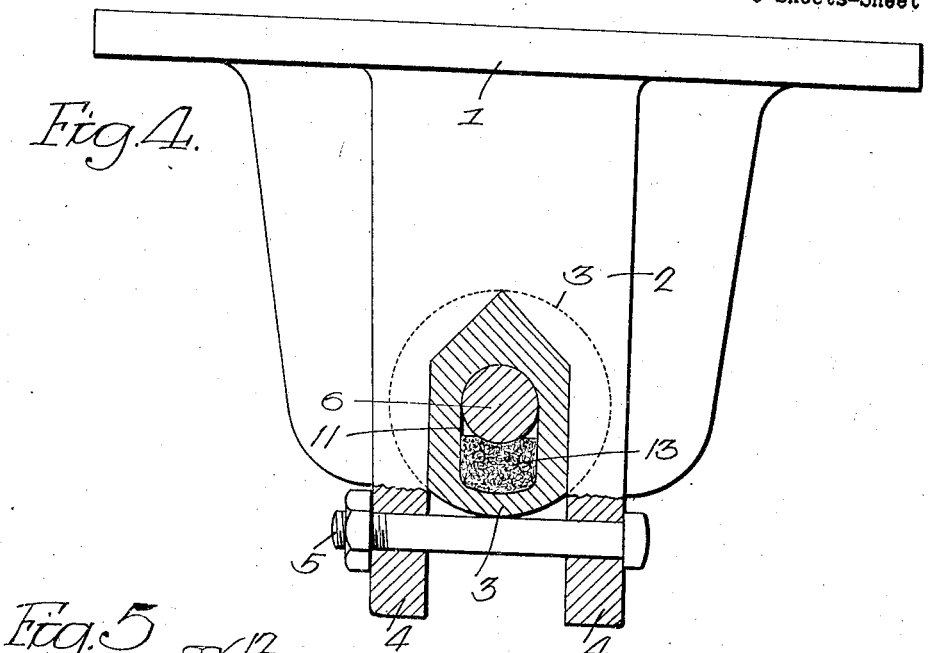
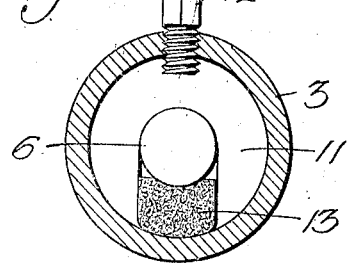
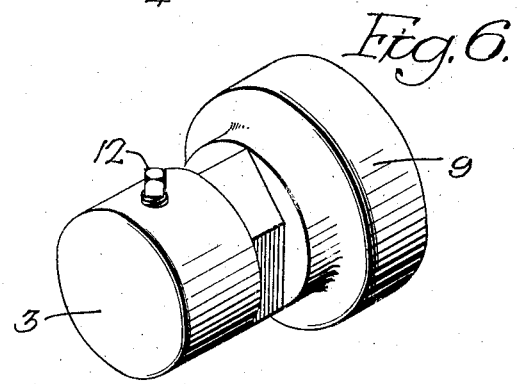
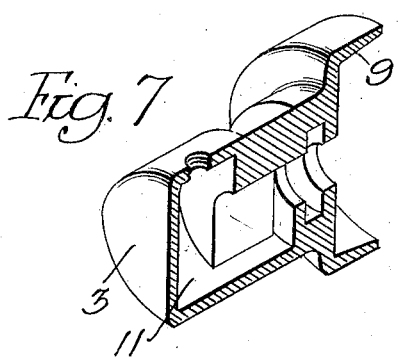
Inventor.-  
James Bowen.  
by his Attorneys.

Patented Mar. 31, 1925.

1,532,032

UNITED STATES PATENT OFFICE.

JAMES BOWEN, OF MANHEIM, PENNSYLVANIA, ASSIGNOR TO BOND FOUNDRY AND MACHINE COMPANY, OF MANHEIM, PENNSYLVANIA, A CORPORATION OF PENNSYLVANIA.

CASTER.

Application filed March 22, 1922. Serial No. 545,777.

*To all whom it may concern:*

Be it known that I, JAMES BOWEN, a citizen of the United States, residing in Manheim, Lancaster County, Pennsylvania, have invented the Caster, of which the following is a specification.

One object of my invention is to provide a novel form of truck caster embodying bearings which shall be self-contained or independent of the caster body, together with novel means for retaining said bearings in position.

I also desire to provide a self-oiling caster with novel means for preventing threads, etc., gathering on its hub and axle, which means are preferably integral with independent bearing structures supporting such axle.

The invention further contemplates a simple, substantial, relatively inexpensive form of caster including novel means for supplying lubricant to its axle and whose construction shall be such as to permit of the parts being quickly and conveniently assembled.

These objects and other advantageous ends I attain as hereinafter set forth, reference being had to the accompanying drawings, in which:

Fig. 3 is a vertical section on the line 3—3, Fig. 2;

Fig. 4 is a sectional view on the line 4—4, Fig. 3;

Fig. 5 is a sectional view on the line 5—5, Fig. 3;

Fig. 6 is a detached perspective view of one of the bearings;

Fig. 7 is a sectional perspective view of one of the bearings;

Fig. 8 is a vertical section of a modified form of the invention, and

Fig. 9 is a fragmentary vertical section illustrating another modification.

Figure 1:
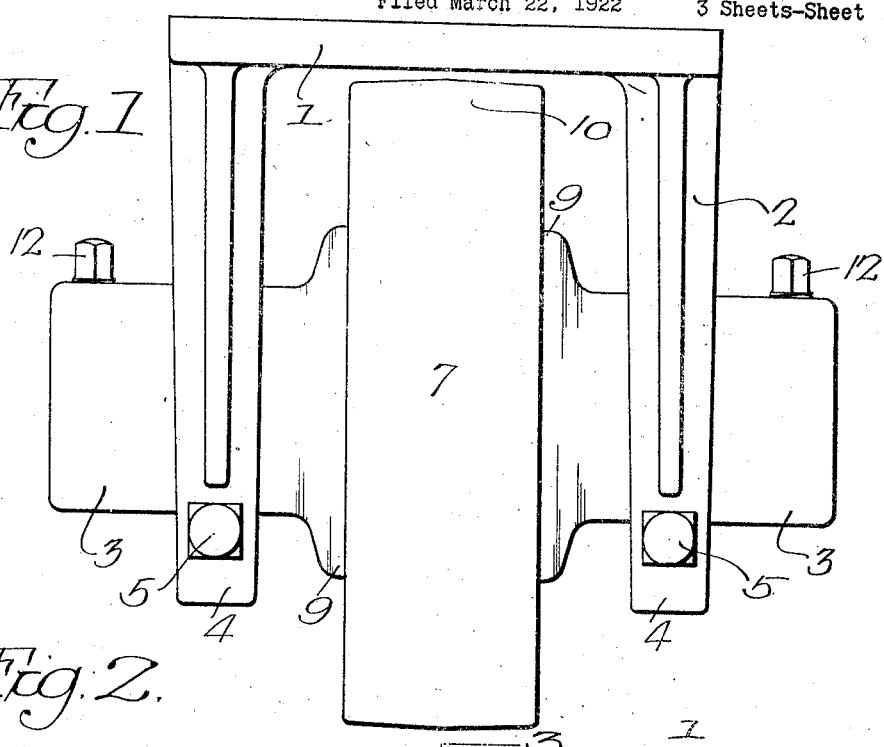
Figures 1 and 2 are respectively side and end elevations of a truck caster constructed in accordance with my invention.
Figure 2:
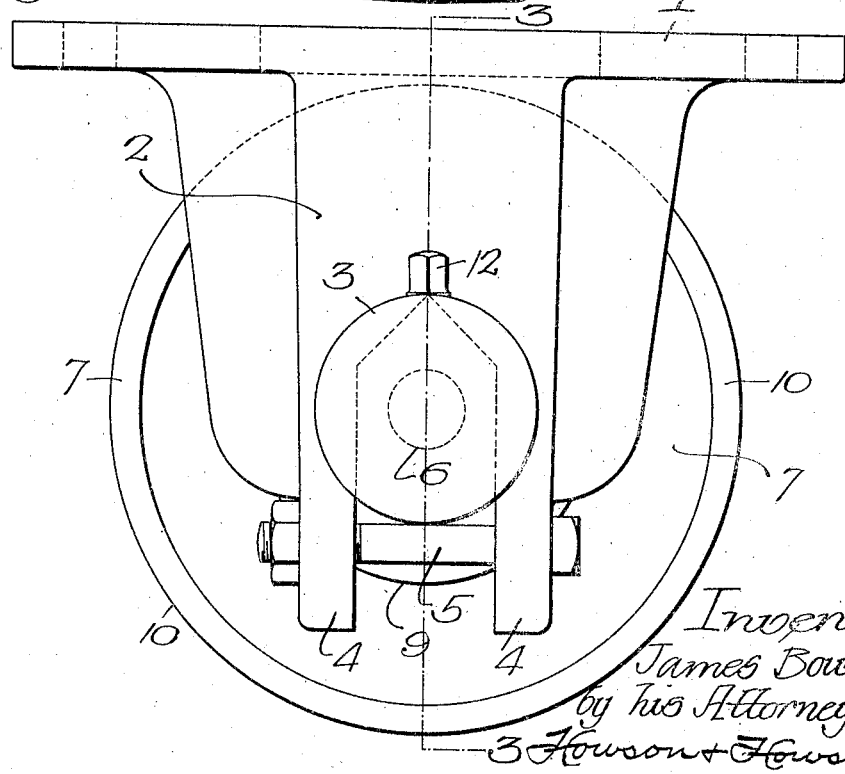

Referring to Figs. 1 to 3 of the above drawings, 1 represents a substantially flat supporting plate having a pair of substantially parallel depending arms 2 whose lower ends are upwardly slotted for the reception of a pair of bearings 3. The slots in the ends of the arms 2 have their upper ends of angular form, and it is noted that the bodies of the bearings 3 while generally cylindrical, are transversely notched or grooved to non-rotatably receive the branches 4 of the arms as well as angularly formed to fit the angular ends of the slots, see Figs. 4 and 6. It will be observed that rotative movement of each box is prevented by the engagement of the reduced non-circular section with the sides of the corresponding slot. It will be further observed that shoulders are formed at the edges of the transversely notched sections which fit or engage the sides of the arm to prevent any longitudinal movement. By means of bolts 5 extending between the branches 4—4 of each arm 2, the two bearings may not only be prevented from falling out of the slots but are rigidly clamped therein.

As shown in Fig. 3, each of the bearings 3 consists of a hollow sleeve or substantially cylindrical body closed at one end and formed with a bell-mouthed enlargement or guard flange 9 at its opposite or open end. These two bearings together serve to rotatably support a spindle 6 having fixed to it a caster wheel or roller 7. The wheel has a hub 8 and a tread 10 with a relatively thin connecting web between them. The hub 8 is formed with plane outer faces engaging or lying immediately adjacent to and parallel with the open ends of the bearings 3 so that the bell-mouthed portions 9 of the latter extend over the hub and between the hub and the tread to within relatively short distances of the web or body of the wheel. This construction effectually prevents threads or other objects gathering either on the hub 8 or on the axle 6.

Each of the bearings adjacent its closed end is formed with an enlarged chamber 11 constituting a lubricant reservoir having an opening into its top normally closed by a threaded or other suitable plug 12, and within the lower portion of this reservoir is mounted a body 13 of suitable lubricant absorbing material such as felt, which extends not only into the reservoir 11 but under and in contact with the adjacent end of the shaft or axle 6. Between the reservoir 11 and the open end of the bearing is an annular recess for the reception of a body of packing 14 whereby leakage of lubricant from said reservoir is effectually prevented.

While the construction shown in Figs. 1 to 3 is that preferably used by me, I may in some cases and under certain conditions employ independent bearings 3ª mounted in the suitably slotted arms 2ª but lacking in the bell-mouthed extensions 9, as shown in Fig. 8. These independent bearings 3ª as before are removably clamped between the branches of their respective arms by bolts 5, and while they each have a lubricant reservoir 11ª and a body 13ª of lubricant-retaining material in engagement with the axle 6, in this case I omit the annular oil retaining packing 14. In this form of my invention the reservoirs 11ª have upwardly opening passages 16 through which oil or other lubricant may be conveniently supplied, the caster wheel 7ª rotating between the arms 2ª with the substantially plane faces of its hub respectively engaged by the faces of the open ends of the bearing structure 3ª.

In both forms of the invention it will be noted that each of the bearings is a self-contained device independent of but removably held in the supporting framework 1—2 or 1—2ª and includes some means, such as the retaining material or packing 13 or 13ª for supplying lubricant from the reservoir to the shaft. If desired, as shown in Fig. 9, I may extend each end of the axle 6 well into the lubricant reservoir and provide it with an oil ring 17 for transferring to it the lubricant in said reservoir. In such case the plug 12 would be replaced by a cap 12ª for the opening whose dimensions would be such as to permit of the introduction of the oil ring.

I claim:

1. The combination in a caster, of a frame having slotted, depending arms; two bearing boxes shaped to fit the slots in the arms; bolts extending below the bearings for drawing the members of the arms firmly upon the boxes; a wheel located between the boxes; a spindle on which the wheel is mounted, said spindle extending into each box, each box being shaped to form a reservoir for lubricant; and means, in each box, for supplying the spindle with lubricant.

2. The combination in a caster, of a frame having slotted, depending arms; a wheel; a spindle on which the wheel is mounted; two independent bearing boxes for the spindle, said boxes being mounted in the arms of the frame, each box being closed at its outer end and having a cavity therein for lubricant; and means for supplying the spindle with lubricant.

3. The combination in a caster of a frame having slotted depending arms; a wheel; a spindle on which the wheel is mounted; two independent bearing boxes for the spindle closed at their outer ends and mounted respectively in the arms of the frame, each box being provided with a cavity for lubricant and with an annular groove surrounding the spindle near the wheel, means in the cavity for supplying lubricant to the spindle, and packing in the annular groove acting to retain the lubricant on the spindle.

4. The combination in a caster, of a frame having two parallel slotted depending arms, a wheel between the arms, a spindle on which the wheel is mounted, and two independent bearing boxes fitting the spindle and at their inner faces engaging the wheel to hold it in place, each bearing box being provided with a non-circular section entering and fitting the slot in the corresponding arm to prevent rotative movement and being also provided with shoulders adjacent the non-circular section fitting the sides of the arm to prevent longitudinal movement.

5. The combination in a caster, of a frame having two parallel slotted depending arms, a wheel between the arms, a spindle on which the wheel is mounted, two independent bearing boxes fitting the spindle and at their inner faces engaging the wheels to hold it in place, each bearing box being provided with a non-circular section entering and fitting the slot in the corresponding arm to prevent rotative movement, and being also provided with shoulders adjacent the non-circular section fitting the sides of the arm to prevent longitudinal movement, and bolts extending across the slots below the boxes for drawing the branches of the arms together and thereby clamping the boxes.

6. The combination in a caster, of a frame having two parallel slotted depending arms, a wheel between the arms having a hub projecting on each side of the web thereof, a spindle on which the wheel is mounted, two independent bearing boxes fitting the spindle and at their inner faces engaging the wheel to hold it in place, each bearing box being provided with a non-circular section entering and fitting the slot in the corresponding arm to prevent rotative movement, and being also provided with shoulders adjacent the non-circular section fitting the sides of the arm to prevent longitudinal movement, and guard flanges on the bearing boxes extending inward around the hub of the wheel into close proximity with the web thereof.

JAMES BOWEN.